United States Patent
Ouyang

(10) Patent No.: US 8,260,047 B2
(45) Date of Patent: Sep. 4, 2012

(54) SYSTEM AND METHOD FOR DETERMINING HIGH FREQUENCY CONTENT IN AN ANALOG IMAGE SOURCE

(75) Inventor: Bing Ouyang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1065 days.

(21) Appl. No.: 12/144,321

(22) Filed: Jun. 23, 2008

(65) Prior Publication Data

US 2009/0316987 A1  Dec. 24, 2009

(51) Int. Cl.
*G06K 9/00* (2006.01)

(52) U.S. Cl. ........................ 382/168; 345/213

(58) Field of Classification Search ........... 382/168–176
See application file for complete search history.

(56) References Cited

U.S. PATENT DOCUMENTS

| | | | |
|---|---|---|---|
| 5,668,898 A * | 9/1997 | Tatsuta | 382/290 |
| 5,867,593 A * | 2/1999 | Fukuda et al. | 382/176 |
| 6,671,417 B1 * | 12/2003 | Koshinaka | 382/254 |
| 6,924,796 B1 * | 8/2005 | Someya et al. | 345/213 |
| 2003/0068085 A1 * | 4/2003 | Said | 382/170 |
| 2004/0001147 A1 * | 1/2004 | Vella et al. | 348/208.99 |
| 2005/0140829 A1 * | 6/2005 | Uchida et al. | 348/625 |
| 2006/0274194 A1 | 12/2006 | Ouyang et al. | |
| 2007/0103570 A1 * | 5/2007 | Inada et al. | 348/252 |
| 2010/0309335 A1 * | 12/2010 | Brunner et al. | 348/231.6 |

* cited by examiner

*Primary Examiner* — Jingge Wu
(74) *Attorney, Agent, or Firm* — Warren L. Franz; Wade J. Brady, III; Frederick J. Telecky, Jr.

(57) ABSTRACT

A system and method for determining high frequency content in an analog image source. A method comprises creating a histogram of the image, and selecting a portion of the image based on the histogram. The histogram comprises a first number of horizontal bins and a second number of vertical bins, with each bin having an associated counter for maintaining a count of pixel differences of pixels in a portion of the image corresponding to the bin that exceed a threshold. The portion of the image selected corresponds to a portion of the histogram having a high pixel difference count relative to other portions of the histogram.

20 Claims, 6 Drawing Sheets

*Fig. 8a*
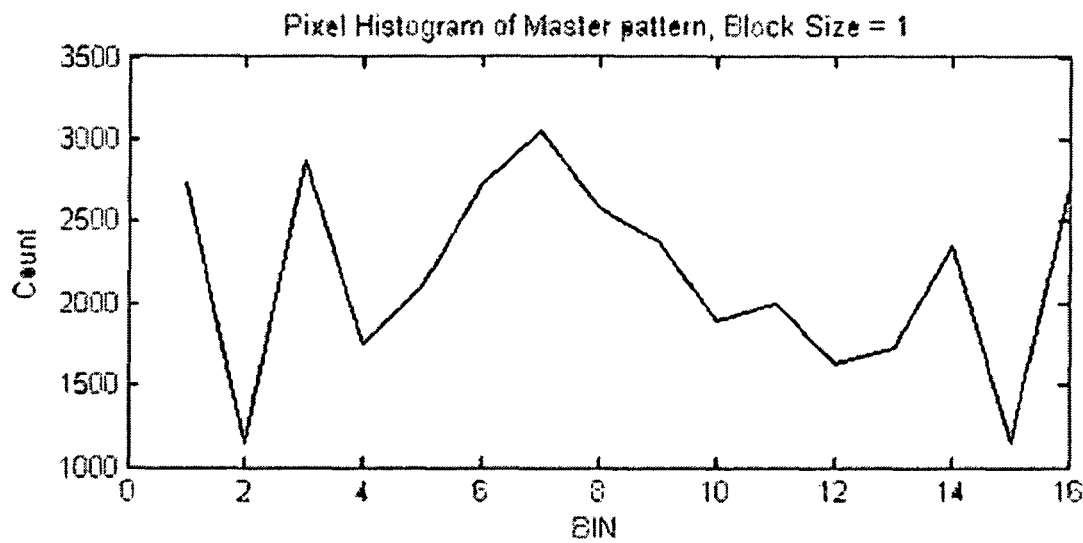
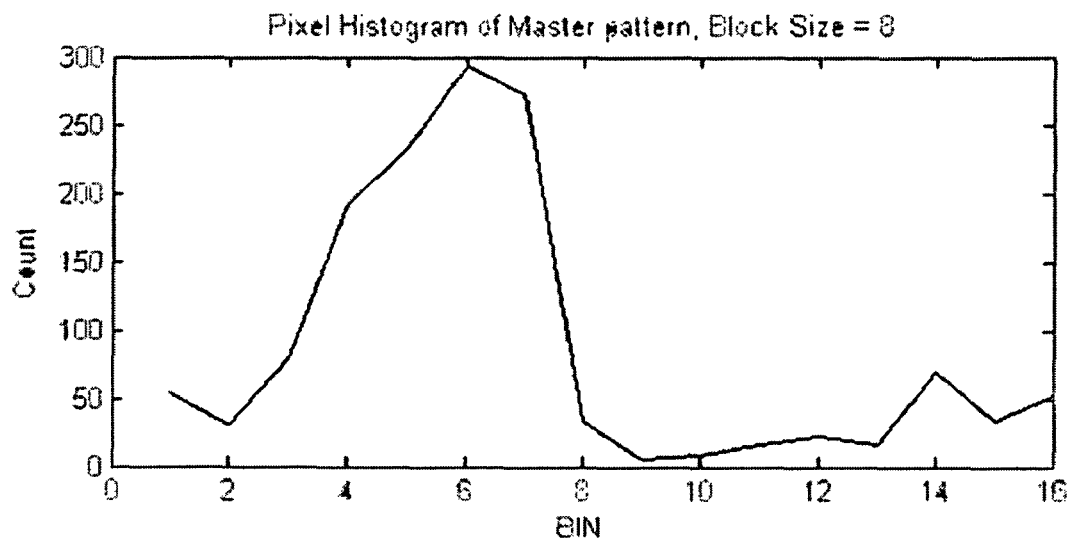
*Fig. 8b*

SYSTEM AND METHOD FOR DETERMINING HIGH FREQUENCY CONTENT IN AN ANALOG IMAGE SOURCE

TECHNICAL FIELD

The present invention relates generally to a system and method for displaying images, and more particularly to a system and method for determining high frequency content in an analog image source.

BACKGROUND

In many modern image display systems, image frames of an analog image signal, such as analog video, analog computer graphics, analog DVDs, analog game console output, and so forth, may be digitized prior to being displayed. Digitizing the image frames of the analog image signal may enable processing of the image frames by image processing hardware in the image display system. The processing performed by the image processing hardware may improve image quality, reduce image noise, enhance desired properties of the image, deemphasize undesired properties of the image, and so on, for example.

The digitizing may include sampling the analog image signal without prior knowledge of a sampling frequency or sampling phase using an analog to digital converter (ADC). In order to properly digitize the images in the analog image signal, a sampling frequency generally must be detected. If the sampling frequency is incorrectly detected, then when the digitized images are displayed, the resulting images may be distorted at best or completely incomprehensible at worst.

In a technique used to determine the sampling frequency, portions of the image containing high frequency content may be used to compute the sampling frequency offset or verify the sampling frequency. This technique makes use of the actual content of the image (and that of subsequent images) to determine the sampling frequency. Therefore, there may be a need to find the portions of an image containing high frequency content to expedite the determining of the sampling frequency.

FIG. 1a illustrates an image 100, wherein the image 100 contains high frequency content 105. The rapidly changing, high contrast, high frequency content 105 may enable the use of the actual content of the image 100 in the determining of the sampling frequency. FIG. 1b illustrates an image 120, wherein the image 120 contains no high frequency content.

FIG. 1c illustrates an image 140, wherein the image 140 contains content that includes some high frequency information, such as line 145 and line 146. However, since processing of the image 140 to determine sampling frequency offset generally requires vertically oriented high frequency data, the lines 145-146 may not include sufficient high frequency information to enable the determining of the sampling frequency offset.

FIG. 2a illustrates an image, such as an image 200, wherein the image 200 includes a portion 205 containing high frequency content. Because an image may or may not contain high frequency content and, if an image contains high frequency content, the high frequency content's location in the image may vary from frame to frame in an image sequence, it may be necessary to locate the high frequency content on an individual image by image basis.

FIGS. 2b through 2d illustrate a technique for locating the portion 205 of the image 200. A binary search may be used to locate the portion 205 of the image 200. Binary search techniques offer shorter than linear search times, which may be important, because finding high frequency content may be crucial in determining a sampling frequency that may be used in displaying the image 200.

FIG. 2b illustrates the image 200, wherein the image 200 has been partitioned into two halves, a first half 220 and a second half 225. The two halves are approximately the same size and divide the image 200 horizontally into two. A check may then be made of each of the two halves to determine if either of the halves contains high frequency content (the portion 205). The check determines that the first half 220 contains the high frequency content and the second half 225 does not, so the second half 225 may be eliminated from subsequent searches.

FIG. 2c illustrates the image 200, wherein the image 200 has been partitioned into two quarters, a first quarter 240 and a second quarter 245. The quarters are partitioned from the first half 220. A check may then be made of each of the two quarters to determine if either of the quarters contains high frequency content. The check determines that the second quarter 245 contains the high frequency content and the first quarter 240 does not, so the first quarter 240 may be eliminated from subsequent searches.

FIG. 2d illustrates the image 200, highlighting the second quarter 245, which contains the high frequency content. The second quarter 245 of the image 200 and of subsequent images may then be used to determine the sampling frequency of the image 200. By providing a percentage of the image 200, rather than the entire image 200, the determining of the sampling frequency may potentially be accelerated. Furthermore, the use of a part of the image 200 instead of the entire image 200 may enable the use of a smaller memory, which may help to reduce the overall cost and complexity of an electronic device making use of the image 200.

FIG. 3 illustrates an electronic device 300 that includes a memory 305 that may not be capable of simultaneously storing the image 200 in its entirety. In such a situation, if the electronic device 300 requires that the entire image 200 be used in determining the sampling frequency, then different parts of the image 200 may need to be moved into the memory 305 while the sampling frequency is being determined. This may complicate and slow down the determining of the sampling frequency. However, if the electronic device 300 may require only a part of the image 200 that contains high frequency content, then only the part of the image 200 containing the high frequency content, wherein the size of the part may correspond to the size of the memory 305, may be provided to the electronic device 300.

SUMMARY OF THE INVENTION

These and other problems are generally solved or circumvented, and technical advantages are generally achieved, by embodiments of a system and a method for determining high frequency content in an analog image source.

In accordance with an embodiment, a method for selecting high frequency content of an image is provided. The method includes creating a histogram of the image, and selecting a portion of the image based on the histogram. The histogram includes a first number of horizontal bins and a second number of vertical bins, with each bin having an associated counter for maintaining a count of pixel differences of pixels in a portion of the image corresponding to the bin that exceed a threshold, and the portion of the image selected corresponds to a portion of the histogram having a high pixel difference count relative to other portions of the histogram.

In accordance with another embodiment, a method for displaying images from an analog image signal is provided.

The method includes partitioning an image from the analog image signal into a first number of horizontal portions with each horizontal portion associated with a horizontal counter in a first number of horizontal counters, computing a horizontal pixel difference for a pixel and an adjacent horizontal pixel, wherein the pixel is associated with an active horizontal counter, incrementing the active horizontal counter in response to a determining that the horizontal pixel difference exceeds a horizontal threshold, thereby generating a histogram of the image, and selecting a portion of the image based on the histogram, wherein the selected portion of the image corresponds to a portion of the histogram having high horizontal counter values relative to other portions of the histogram. The method also includes generating image data from the selected portion of the image, determining a sampling frequency from the image data, sampling the analog image signal at the sampling frequency to produce image samples, processing the image samples, and displaying the processed image samples.

In accordance with another embodiment, a display system is provided. The display system includes a display configured to produce images by modulating light based on image data, an image input providing an analog image signal comprising the image data, an image processing unit coupled to the image input, an image selecting unit coupled to the image input and to the image processing unit, and a controller coupled to the image processing unit and to the image selecting unit. The image processing unit digitizes the analog image signal and eliminates a sampling frequency offset in a first sampling frequency of the analog image signal and a second sampling frequency of the image processing unit, the image selecting unit selects a portion of an image in the analog image signal having high frequency content, wherein the image selecting unit selects the portion of the image by computing a histogram of the image and selecting the portion of the image corresponding to a portion of the histogram having a high number of adjacent pixel differences exceeding a threshold relative to other portions of the histogram. The controller controls the operation of the display system based on image data.

An advantage of an embodiment is that portions of an image containing high frequency content may be rapidly found. This may expedite the determining of the sampling frequency of the analog image signal.

A further advantage of an embodiment is that only the portions of an image containing high frequency content may need to be processed to determine the sampling frequency. The remainder of the image may not need to be stored. This may allow for smaller image buffers, thereby reducing costs of the image display system.

Yet another advantage of an embodiment is that filtering may be employed to help reduce a likelihood of non-high frequency content being determined as being high frequency content. This may help improve the performance and accuracy of techniques used in determining the sampling frequency from image content.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 8a and 8b are diagrams of data plots of histogram data for an image with and without the use of a block filter;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a digital micromirror device (DMD) microdisplay-based image projection display system connected to an analog image source, such as a computer. The invention may also be applied, however, to other forms of analog image sources, such as analog video tape, analog DVDs, analog game console output, analog electronic video sources, such as multimedia players and sources, and so on. Furthermore, the invention may be applied to other forms of microdisplay-based image projection display systems including deformable micromirrors, liquid crystal on silicon (LCOS), ferroelectric liquid-crystal-on-silicon, reflective, transmissive, and transflective liquid crystal displays (LCD), and so forth. Additionally, the invention may be applied to other types of video display systems, including direct view display systems, such as those using plasma, LCD, cathode ray tube (CRT), and so on, displays. In general, the invention may be applied to applications wherein there is a desire to display an analog image source.

Figure 4A:
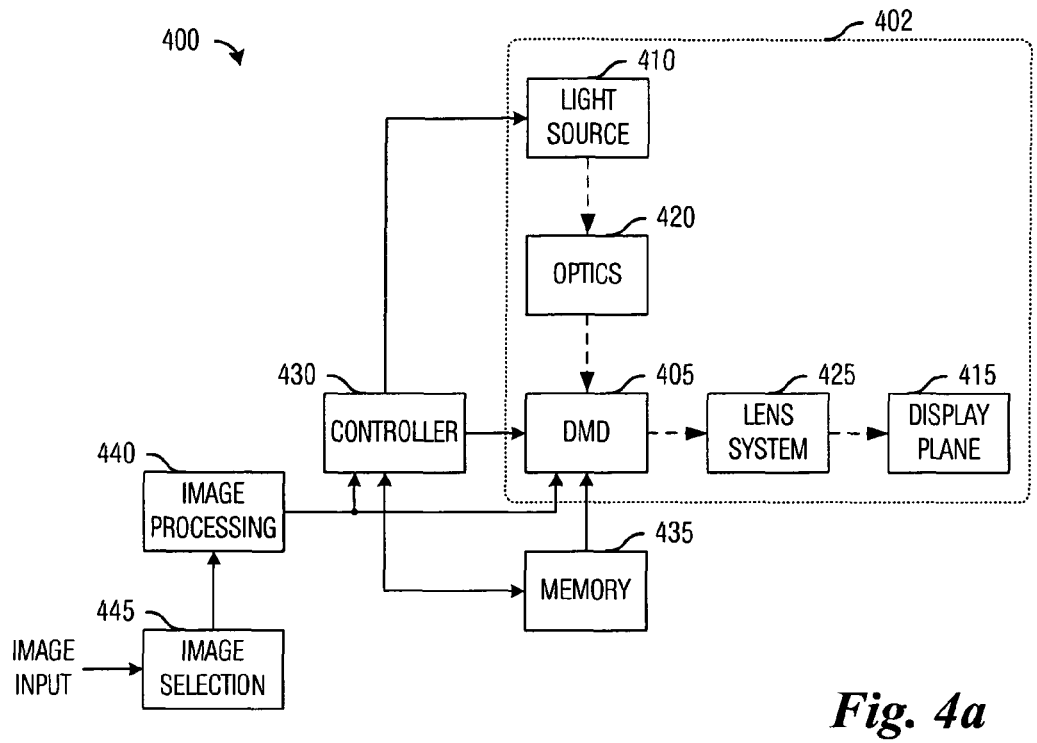
FIG. 4a is a diagram of a display system.

FIG. 4a illustrates an image display system 400. The image display system 400 includes an imaging unit 402 that may be used to display images. The image display system 400 shown in FIG. 4a is a DMD-based projection display system and the imaging unit 402 includes a DMD 405 that modulates light produced by a light source 410. The DMD 405 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array.

Each light modulator in the microdisplay may operate in conjunction with the other light modulators in the microdisplay to modulate the light produced by the light source 410. For example, in the DMD 405, each light modulator is a pivoting mirror that generally pivots between one of two positions depending on image data being displayed. In a first position, the light modulator reflects light from the light source onto a display plane 415 and in a second position, the light modulator reflects light away from the display plane 415. The light modulated by the DMD 405 may be used to create images on the display plane 415. The video projection display system 400 also includes an optics system 420, which may be used to collimate the light produced by the light source 410 as well as to collect stray light, and a lens system 425, which may be used to manipulate (for example, focus) the light reflecting off the DMD 405.

If the image display system 400 is a different form of image display system, then the imaging unit 402 may be correspondingly different. For example, if the image display system 400 uses a different form of microdisplay, then the imaging unit 402 may include the different microdisplay in place of the DMD 405. Alternatively, if the image display system 400 is a direct view system instead of a projection system, then the imaging unit 402 may not include the display plane 415 and potentially the lens system 425. Furthermore, if the image display system 400 is a cathode ray tube-based direct view system, then the imaging unit 402 may not include the light source 410, the optics system 420, the lens system 425, or the display plane 415. If the image display system 400 is a cathode ray tube-based projection system, then the imaging unit 402 may include the lens system 425 and the display plane 415.

The DMD 405 may be coupled to a controller 430, which may be responsible for loading image data into the DMD 405, controlling the operation of the DMD 405, providing micromirror control commands to the DMD 405, controlling the light produced by the light source 410, and so forth. A memory 435, which may be coupled to the DMD 405 and the controller 430, may be used to store the image data, as well as configuration data, color correction data, and so forth.

The image display system 400 includes an image processing unit 440. The image processing unit 440 may be used to digitize images from an analog image signal provided by an image input. The image processing unit 440 also includes a clock configured to provide a reference signal at a sampling frequency to time the digitizing of the images from the analog image signal. Additionally, the image processing unit 440 includes the ability to determine and correct for an offset that may be present between an actual sampling frequency of the analog image signal and a sampling frequency as generated by the clock, wherein the image processing unit 440 uses techniques to determine a period of a vertical interference pattern present in images sampled at a sampling frequency having an offset from the actual sampling frequency of the analog image signal and to use the period of the vertical interference pattern to determine and then reduce or eliminate the offset.

The image display system 400 also includes an image selection unit 445. The image selection unit 445 may be used to select portions of images containing high frequency content from the analog image signal provided by the image input. The image selection unit 445 may provide a contiguous portion of an image that contains high frequency content or individual portions of an image containing high frequency content. The portions of images containing high frequency content may be provided to the controller 430 (or a dedicated processing unit) that may be configured to determine a sampling frequency using the high frequency content. The image selection unit 445 may also help to reduce the erroneous detection of certain types of image content that may be confused as high frequency content, such as sparsely distributed single vertical lines, and so forth.

Figure 1A:
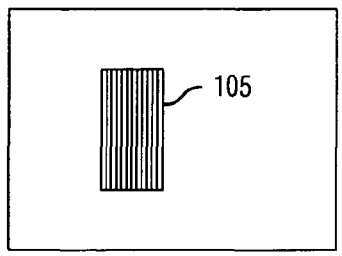
FIGS. 1a through 1c are diagrams of images having different amounts of high frequency content.
Figure 1B:
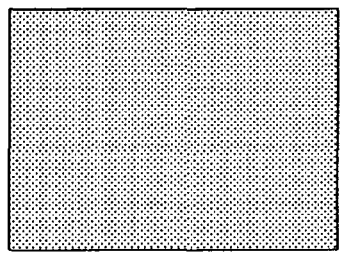
Figure 1C:
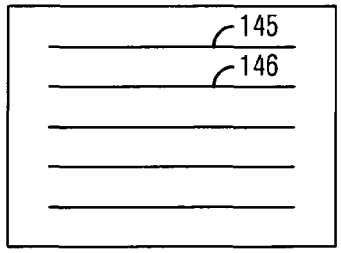
Figure 2A:
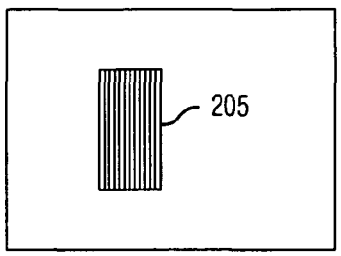
FIGS. 2a through 2d are diagrams of a sequence of images undergoing a search for high frequency content.
Figure 2B:
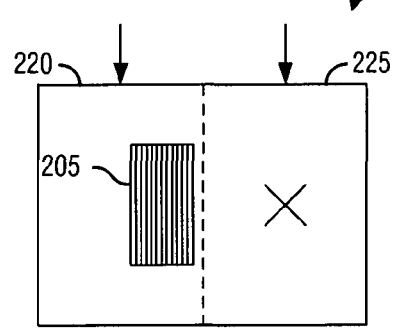
Figure 2C:
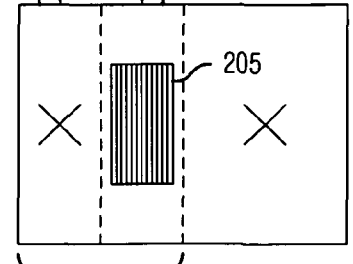
Figure 2D:
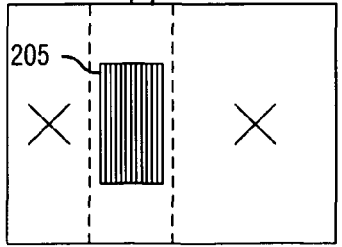
Figure 3:
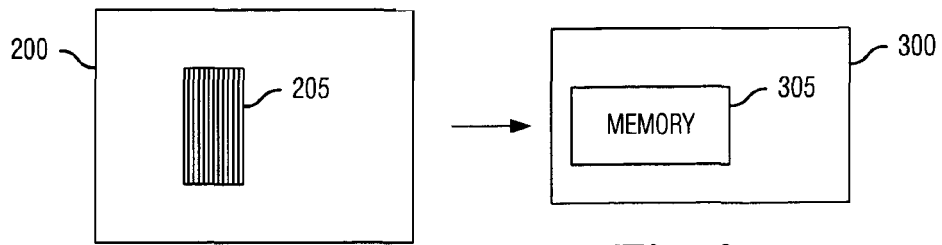
FIG. 3 is a diagram of an image larger in size than a memory to be used to determine a sampling frequency of the image.
Figure 5:
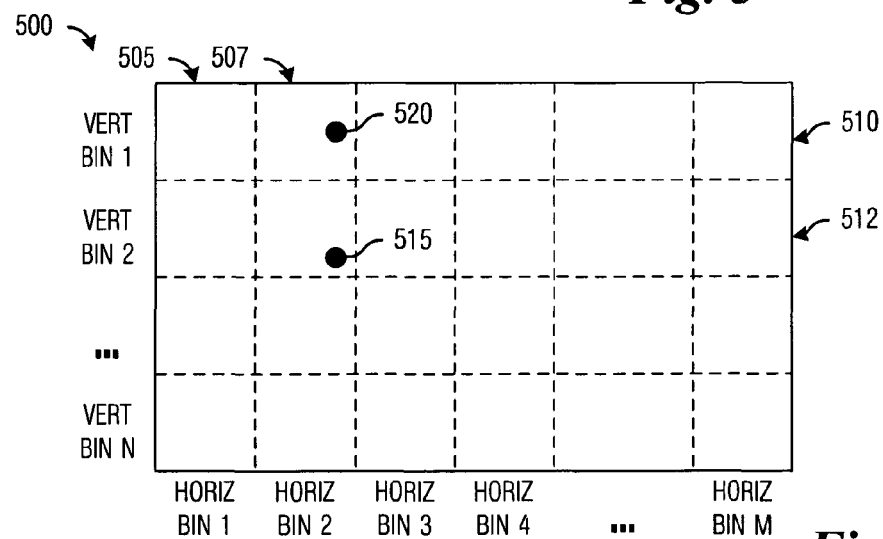
FIG. 5 is a diagram of an image partitioned into horizontal bins and vertical bins.
Figure 4B:
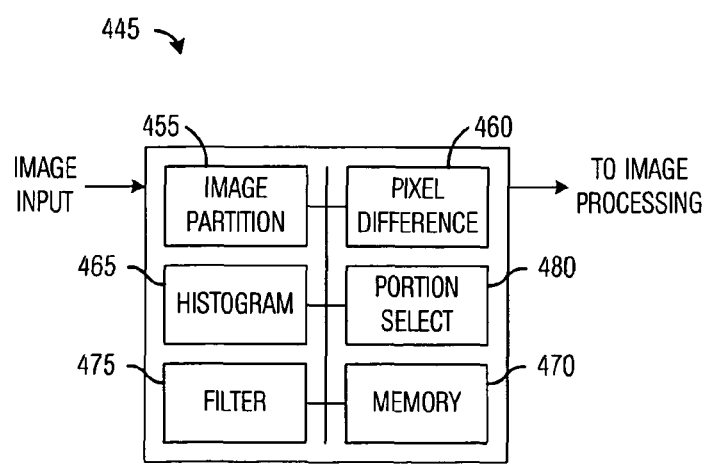
FIG. 4b is a diagram of detailed view of an image selection unit.

FIG. 4b illustrates a detailed view of the image selection unit 445. The image selection unit 445 includes an image partition unit 455 that may be used to partition an image into bins, both horizontally and vertically. An image may be partitioned into a first number of horizontal bins and a second number of vertical bins. The first number of horizontal bins may or may not be equal to the second number of vertical bins. Additionally, the size of the horizontal bins and the vertical bins may or may not be equal. FIG. 5 illustrates an image 500 partitioned into M horizontal bins, such as horizontal bin 1 505 and horizontal bin 2 507. The image 500 may also be partitioned into N vertical bins, such as vertical bin 1 510 and vertical bin 2 512. M and N may be integer values that may or may not be equal.

Individual picture elements (pixels) in the image 500 may be referenced by a horizontal bin and a vertical bin to which they belong. For example, a first pixel 515 may be a member of horizontal bin 2 507 and vertical bin 2 512, while a second pixel 520 may be a member of horizontal bin 2 507 and vertical bin 1 510.

Turning back now to FIG. 4b, the image selection unit 445 also includes a pixel difference unit 460. The pixel difference unit 460 may compute a difference between adjacent pixels. The pixel difference unit 460 may compute a difference between horizontally adjacent pixels; however, the pixel difference may also be computed between vertically adjacent pixels. For example, the pixel difference unit 460 may simply subtract an overall brightness intensity of a pixel A from a brightness intensity of a pixel B. Alternatively, the pixel difference unit 460 may compute a difference in grayscale in a specified color (for example, red, green, blue, or combinations thereof) between two adjacent pixels. For example if pixel A's grayscale values for the colors (red, green, blue) are (2, 10, 20) and pixel B's grayscale values for the same colors are (230, 240, 250), then the pixel difference unit 460 may compute the difference in grayscale to be (−228, −230, −230). The pixel difference unit 460 may compute the difference in grayscale for all colors, or some specified colors.

The image selection unit 445 also includes a histogram unit 465. The histogram unit 465 may create a histogram for an image using the output from the pixel difference unit 460. The histogram unit 465 may utilize the bins created by the image partition unit 455 in creating its histogram. The histogram unit 465 may compare the output of the pixel difference unit 460 and if the difference is greater than a threshold, the histogram unit 465 may increment counts in respective bins of a pixel. For example, if a difference between the first pixel 515 (shown in FIG. 5) and an adjacent (horizontally adjacent) pixel is greater than the threshold, then the histogram unit 465 may increment a counter associated with the horizontal bin 2 507 and a counter associated with the vertical bin 2 512. If the difference is not greater than the threshold, then the histogram unit 465 may leave the counts unchanged. The counters may be stored in a memory 470. The memory 470 may be a dedicated memory that is a part of the image selection unit 445 or the memory 470 may a portion of the memory 435.

The image selection unit 445 further includes a filter unit 475 and a portion select unit 480. The filter unit 475 may be used to implement a block filter that may be used to help distinguish between high frequency content and the lines and test patterns may be erroneously detected as high frequency content. The filter unit 475 may require that a percentage of the pixel differences within a specified block be greater than the threshold before a count (counter) for a bin (horizontal and/or vertical) associated with the block is incremented. The portion select unit 480 may be used to select a portion of an image containing high frequency content. The portion select unit 480 may select a contiguous portion of the image corresponding to a contiguous group of counts (counters) having counts that are relatively higher than other counts (counters) or it may select individual portions of the image corresponding to individual counts (counters) having counts relatively higher than other counts.

Figure 6A:
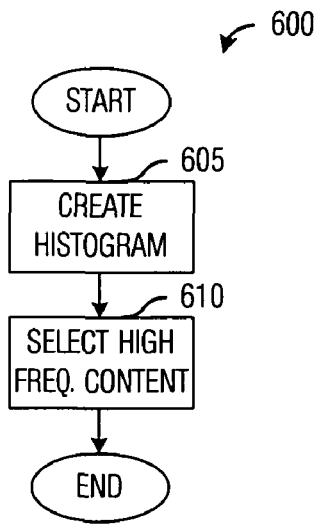
FIG. 6a is a diagram of a sequence of events in the selection of high frequency content in an image.

FIG. 6a illustrates a sequence of events 600 in the selecting of a portion of an image containing high frequency content. The selecting of a portion of an image containing high frequency content may be initiated when there is a need to determine the location of high frequency content in an image, which may be used in determining a sampling frequency, for example. The selecting of a portion of an image containing high frequency content may begin with a creating of a histogram of the image (block 605). The creating of the histogram may begin with a partitioning of the whole image or a certain sub-section of the image into a number of bins horizontally and vertically. The number of horizontal bins may be equal to the number of bins vertically or they may be different. Then pixels in the image may be processed to determine a difference in pixel value between adjacent pixels. If the difference is greater than a threshold, then a count or counter associated with a bin corresponding to a portion of the image containing the pixel may be incremented. The count or counter values may then be an indicator of a distribution of large pixel differences throughout the image.

Figure 6B:
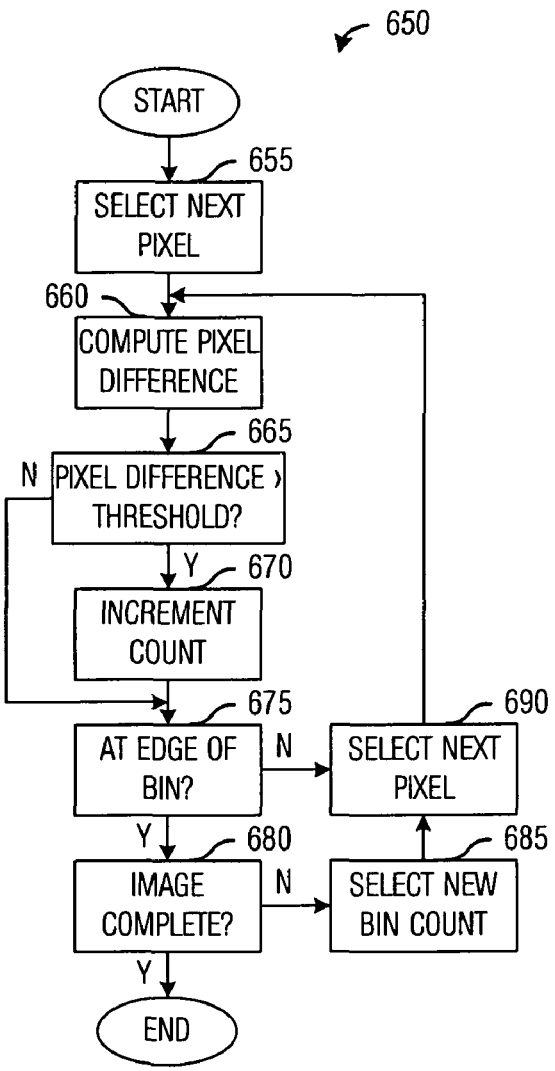
FIG. 6b is a diagram of a sequence of events in creating a histogram.

FIG. 6b illustrates a sequence of events 650 in the creating of a histogram for an image. The sequence of events 650 may be an implementation of the creating of the histogram (block 605). The creating of the histogram may begin with a selecting of a pixel (block 655). For practicality, pixel selection may start at one corner of an image and progress along a horizontal line until the end of the horizontal line is reached. Then, the next pixel selected may be a first pixel of a next horizontal line. This may be repeated until all of the pixels in the image (or the sub-section of the image) have been selected and processed.

With the pixel selected, a pixel difference between the selected pixel and an adjacent pixel may be computed (block 660). Depending on implementation, the pixel difference may be computed between the selected pixel and an adjacent pixel on the same horizontal line (pixels selected along the same horizontal line may be referred to as being horizontally adjacent, while adjacent pixels selected along different horizontal lines may be referred to as being vertically adjacent), wherein the adjacent pixel may have already been selected or the adjacent pixel may have not already been selected. For example, let pixels A, B, and C be three adjacent pixels on a horizontal line. Let pixel B be the selected pixel, with pixel A being a pixel having already been selected. The pixel difference may be computed between pixel B and pixel A or between pixel B and pixel C.

If the selected pixel is the last pixel (or a first pixel) on a horizontal line, then there may not be an adjacent pixel with which to compute a pixel difference. For example, if the pixel difference computes a difference between the selected pixel and a next pixel, then the last pixel on a horizontal line may not have a pixel with which to compute a pixel difference. Similarly, if the pixel difference computes a difference between the selected pixel and a previous pixel, then the first pixel on a horizontal line may not have pixel with which to compute a pixel difference. If this is the situation, then a pixel difference may not be computed.

After computing the pixel difference (block 660), a comparison may be made between the pixel difference and a threshold (block 665). If the pixel difference is greater than the threshold, meaning that there is significant difference between the two adjacent pixels, then a count (counter) associated with a bin containing the selected pixel may be incremented (block 670). If the pixel difference is not greater than the threshold, then the counter may be left unchanged.

The comparison of the pixel difference with the threshold and the incrementing of the counter associated with a bin containing the selected pixel may be performed along both horizontal and vertical orientations. For example, the selected pixel may be a member of a horizontal bin and a vertical bin, so the result of the comparison of the pixel difference and the threshold may affect count (counter) values of both bins. A single pixel difference may affect both bins. For example, a pixel difference involving pixels that are horizontally adjacent may affect the count (counter) values of both the horizontal bin and the vertical bin. Alternatively, different pixel differences may be used. For example, a pixel difference involving pixels that are horizontally adjacent may be used to affect the count (counter) value of the horizontal bin associated with the selected pixel, while a pixel difference involving pixels that are vertically adjacent may be used to affect the count (counter) value of the vertical bin associated with the selected pixel. The creating of the histogram along horizontal and vertical orientations may occur serially or in parallel.

An additional check may be performed to determine if the selected pixel is at an edge of a bin, such as a horizontal bin (block 675). If the selected pixel is at an edge of a bin, then an additional check may be performed to determine if all of the pixels in the image have been processed (block 680). If all of the pixels in the image have been processed, then the creating of the histogram may terminate. If all of the pixels in the image have not been processed, then a new bin count (counter) may be selected (block 685). After selecting a new bin count (counter) (block 685), another pixel may be selected (block 690) and the creating of the histogram may continue. If the selected pixel is not at an edge of a bin, then another pixel may be selected (block 690) and the creating of the histogram may continue.

Some image content, such as sparsely distributed single vertical lines, grid lines, certain test patterns, and so forth, may provide a false indicator of being high frequency content when the pixel difference technique is used in the creating of the histogram. While there may be high frequency content in the lines, there may not be enough to ensure that a sampling frequency may be detected. A block filter may be used to help distinguish between actual high frequency content and the lines and test patterns may be erroneously detected as high frequency content. The use of the block filter may require that a percentage of the pixel differences within a specified block be greater than the threshold before the count (counter) for a bin (horizontal and/or vertical) associated with the block is incremented.

Figure 7A:
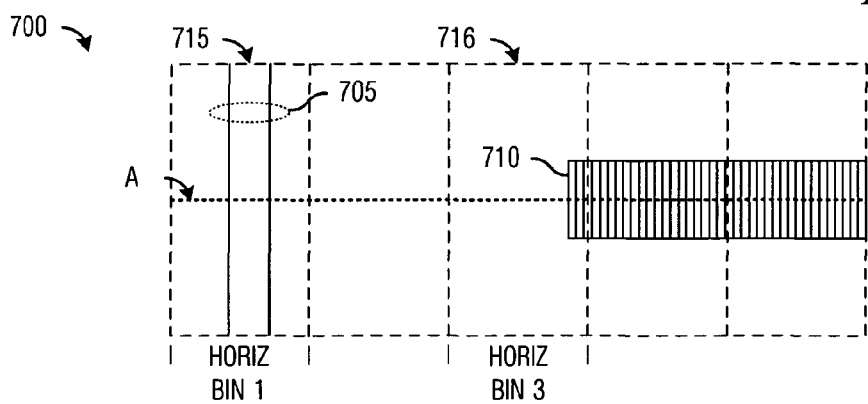
FIG. 7a is a diagram of an image containing content that may lead to an erroneous detection of high frequency content.

FIG. 7a illustrates a portion of an image 700, wherein the image 700 contains image content that may produce similar bin count (counter) values. The image 700 contains a pair of vertical lines 705 and a high frequency pattern 710. The image 700 may be partitioned into a number of horizontal bins, such as horizontal bin 1 715 and horizontal bin 3 716. Computing pixel differences along a horizontal line (line A), the resulting changes to the bin count (counter) values for the horizontal bin 1 715 and the horizontal bin 3 715 may be identical with a change of two (2).

Figure 7B:
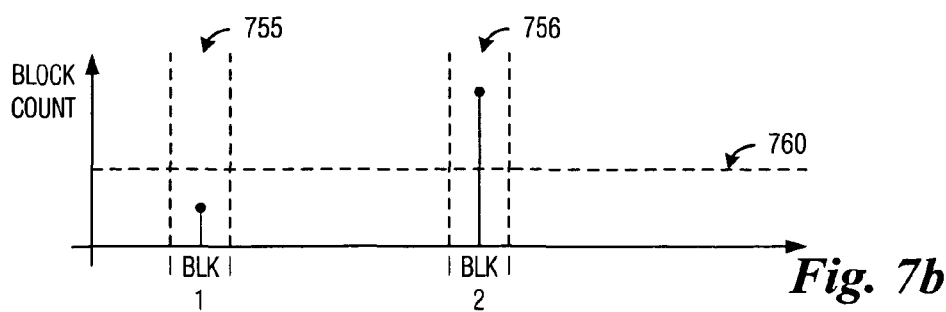
FIG. 7b is a diagram of the function of a block filter in reducing the erroneous detection of high frequency content.

FIG. 7b illustrates a data plot 750 of block count for a number of blocks, such as block 1 755 and block 2 756, created along the horizontal line (line A). Also shown in FIG. 7b is a percentage threshold 760, wherein the percentage of pixel differences within a block must exceed the percentage threshold 760 before to the count (counter) is incremented. A count of pixel differences exceeding the threshold in block 1 755 may not exceed the percentage threshold 760, so the count (counter) for an associated bin may not be incremented, while a count of pixel differences exceeding the threshold in block 2 756 may exceed the percentage threshold 760, so the count (counter) for an associated bin may be incremented.

FIGS. 8a and 8b illustrate (horizontal) histograms (bin count (counter) values) for an image containing a test pattern, wherein block filters of size one (1) (FIG. 8a) and size eight (8) (FIG. 8b) are used. The test pattern used may be commonly referred to as a Master test pattern. The histogram for the image created using a block filter of size one (1), substantially, no block filtering, may erroneously indicate that portions of the image corresponding to bins one, three, seven, and sixteen contain high frequency content. The histogram for the image created using a block filter of size eight (8) may indicate that only portions of the image corresponding to bins six and seven contain high frequency content. The use of the block filter may significantly reduce the count (counter) values of the bins.

Referencing back now to FIG. 6a, after creating the histogram, the histogram may be used to select the portions of the image containing high frequency content (block 610). Since the intent may be to find portions of the image containing high frequency content, portions of the image corresponding to bins having high count (counter) values may contain high frequency content. Therefore, portions of the image corresponding to bins having high count (counter) values may be selected as portions of the image having high frequency content and may be used to determine a sampling frequency. The portions of the image may be provided to the controller 430 to determine the sampling frequency, for example, and the selection of a portion of an image containing high frequency content may terminate.

Figure 9:
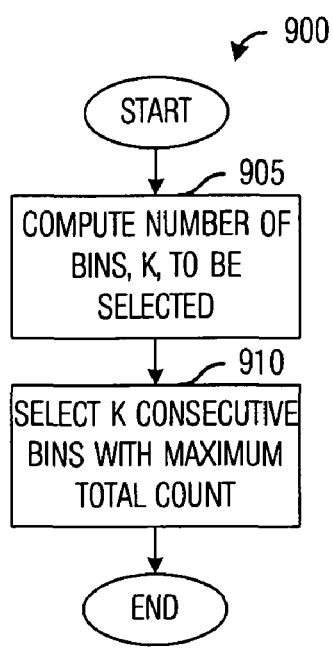
FIG. 9 is a diagram of a sequence of events in selecting a portion of an image for use in determining a sampling frequency.

FIG. 9 illustrates a sequence of events 900 in the selection of a portion of an image for use in determining a sampling frequency. The sequence of events 900 may be an implementation of the select portions of the image containing high frequency content (block 610 of FIG. 6a). The selection of the portion of an image for use in determining a sampling frequency may begin with a computing of a number of portions (K) of the image to be selected (block 905). The number of portions of the image to be selected may be dependent on several factors, including the size of the individual portions, a size of a memory to be used in the determining of a sampling frequency, purpose of the region selected, and so forth. If the size of the memory to be used in the determining of a sampling frequency is larger than the image and the current application is for sample frequency verification, then the entire image may be selected, since in such application, grid lines or sparsely distributed vertical lines may not be an issue. However, if the application is to compute the sampling frequency offset, then continuous high frequency content may be required. The computing of the number of portions described below may be used when either the memory used in the computing is smaller than the image size or when a selecting of a sub-section of an image containing a continuous high frequency region is desired.

The computing of the number of portions may be expressed mathematically as:

$$\#\_portions = \left\lfloor \frac{memory\_size}{image\_resolution} \right\rfloor * \#\_bins,$$

where #_bins is the number of horizontal bins, memory_size is the size of the memory used in the determining a sampling frequency, image_resolution is the number of horizontal pixels in the image, and $\lfloor expression \rfloor$ returns a largest integer value less than the expression.

After determining the number of portions (K) (block 905), a portion of the image corresponding to K consecutive bins having a highest sum of count (counter) values may be selected (block 910) and then provided for use in determining a sampling frequency. As an example, the selection of K consecutive bins having a highest sum of count (counter) values may be expressed algorithmically as:

```
MAX = 0;
for i = 1:#_bins—K,
    if((bin(i) +bin(i+1) +... + bin(i+K)) > MAX) then
        start_bin = i;
    end
end.
```

The selection of K consecutive bins may be readily extended to vertical bins or both vertical and horizontal bins.

The selection of a portion of an image for use in determining a sampling frequency discussed above focuses on the selection of K consecutive bins having a highest sum of count (counter) values. It may also be possible to select K bins having the K highest count (counter) values. Furthermore, the selection of K consecutive bins selects only from bins of a single dimension (either horizontal bins or vertical bins). The selection of K bins (either consecutive or non-consecutive) may also be extended to selecting bins of both dimensions (both horizontal and vertical bins). Therefore, the discussion of K consecutive bins along one dimension should not be construed as being limiting to either the scope or the spirit of the embodiments.

Figure 10:
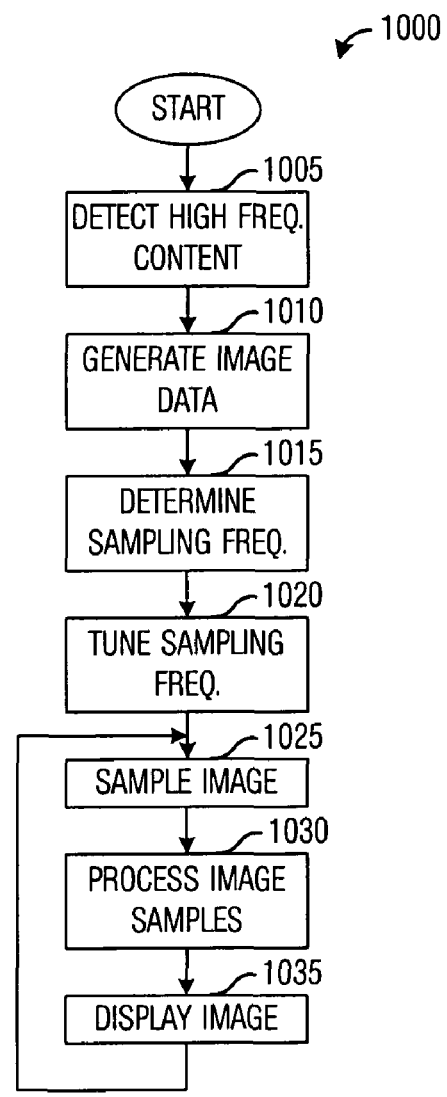
FIG. 10 is a diagram of a sequence of events in displaying images from an analog image signal.

FIG. 10 illustrates a sequence of events 1000 in displaying images from an analog image signal. The sequence of events 1000 may be descriptive of events occurring in a digital display device displaying images from an analog image source. The displaying of images may begin with a detecting of high frequency content in an image from the analog image signal (block 1005). The detecting of high frequency content may be achieved by creating a histogram from the image and then selecting portions of the histogram having high count (counter) values. After detecting the high frequency content, the portions of the image having the high frequency content (the portions of the image corresponding to portions of the histogram having high count (counter) values) may be generated (block 1010) and provided to a sampling frequency unit to determine the sampling frequency (block 1015).

After the sampling frequency has been determined, it may be necessary to tune the sampling frequency to ensure that the sampling frequency used to sample the analog image signal is substantially correct (block 1020). The analog image signal may then be sampled (digitized) at the sampling frequency to create image samples (block 1025) that may be processed (block 1030). The processing of the image samples may help to improve image quality, reduce noise, enhance desired features, and so forth. After processing, the image samples may then be displayed (block 1035). The sampling, the processing, and the displaying may continue while the digital display device is in operation.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for displaying images from an analog image signal, the method comprising:
    partitioning an image from the analog image signal into a first number of horizontal portions with each horizontal portion associated with a horizontal counter in a first number of horizontal counters;
    computing a horizontal pixel difference for a pixel and an adjacent horizontal pixel, wherein the pixel is associated with an active horizontal counter;
    incrementing the active horizontal counter in response to a determining that the horizontal pixel difference exceeds a horizontal threshold, thereby generating a histogram of the image;
    selecting a portion of the image based on the histogram, wherein the selected portion of the image corresponds to a portion of the histogram having high horizontal counter values relative to other portions of the histogram;
    generating image data from the selected portion of the image;
    determining a sampling frequency from the image data;
    sampling the analog image signal at the sampling frequency to produce image samples;
    processing the image samples; and
    displaying the processed image samples.

2. The method of claim 1, wherein the generating the histogram further comprising:
    partitioning the image into a second number of vertical portions with each vertical portion associated with a vertical counter in a second number of vertical counters;
    computing a vertical pixel difference for the pixel and an adjacent vertical pixel, wherein the pixel is in a first horizontal line and the adjacent vertical pixel is in a second horizontal line adjacent to the first horizontal line, and wherein the pixel is associated with an active vertical counter; and
    incrementing the active counter in response to a determining that the vertical pixel difference exceeds a vertical threshold.

3. The method of claim 1, wherein the selecting the portion of the image comprises selecting a continuous portion of the image having high horizontal counter values and high vertical counter values.

4. The method of claim 1, wherein the selecting the portion of the image comprises selecting a continuous portion of the image having high horizontal counter values.

5. The method of claim 1, wherein the incrementing the active horizontal counter comprises incrementing the active horizontal counter in response to a determining that a percentage of horizontal pixel differences in a block of pixels exceeds a percentage threshold.

6. The method of claim 1, wherein the histogram comprises a first number of horizontal bins and a second number of vertical bins, with each bin having an associated counter for maintaining a count of pixel differences of pixels in a portion of the image corresponding to the bin that exceed a threshold.

7. The method of claim 6, wherein:
    in partitioning the image into the first number of horizontal portions, each horizontal portion corresponds to a horizontal bin in the first number of horizontal bins; and the image is further partitioned into a second number of vertical portions, each vertical portion corresponding to a vertical bin in the second number of vertical bins; and
    computing the horizontal pixel difference includes computing a difference for a pixel that belongs in an active horizontal bin.

8. The method of claim 7, wherein the pixel further belongs in an active vertical bin, and wherein the method further comprises:
    computing a vertical pixel difference for the pixel; and
    incrementing a second counter associated with the active vertical bin in response to a determining that the vertical pixel difference exceeds a second threshold.

9. The method of claim 7, wherein the pixel is a pixel on a horizontal line in the image, and the method further comprises, after the incrementing the counter:
    selecting a new pixel, wherein the new pixel is adjacent to the pixel on the horizontal line; and
    repeating the computing and the incrementing the counter, for the new pixel.

10. The method of claim 9, wherein selecting the new pixel comprises selecting the new pixel on a new horizontal line in response to a determining that the pixel is a last pixel on the horizontal line.

11. The method of claim 10, wherein the new horizontal line is adjacent to the horizontal line.

12. The method of claim 7, wherein the incrementing the counter comprises incrementing the counter associated with the active horizontal bin in response to a determining that a percentage of pixel differences for a block of pixels in the active horizontal bin exceeds the threshold.

13. The method of claim 7, wherein the pixel difference is selected from the group consisting of: pixel brightness intensity difference, pixel grayscale difference between one or more colors, and combinations thereof.

14. The method of claim 6, wherein the selecting the portion of the image comprises selecting a group of K continuous horizontal bins, where K is an integer value, wherein a sum of counter values associated with the group of K continuous horizontal bins is greater than a sum of counter values for any other group of K continuous horizontal bins.

15. The method of claim 14, wherein K is based on a size of a memory to contain the high frequency content and a size of the image corresponding to each horizontal bin.

16. The method of claim 6, wherein the selecting the portion of the image comprises selecting K horizontal bins, where K is an integer value, and wherein the counter values associated with the selected horizontal bins are the K largest counter values of all horizontal bins.

17. A display system comprising:
a display configured to produce images by modulating light based on image data;
an image input providing an analog image signal comprising the image data;
an image processing unit coupled to the image input, the image processing unit configured to digitize the analog image signal and to eliminate a sampling frequency offset in a first sampling frequency of the analog image signal and a second sampling frequency of the image processing unit;
an image selecting unit coupled to the image input and to the image processing unit, the image selecting unit configured to select a portion of an image in the analog image signal having high frequency content, wherein the image selecting unit selects the portion of the image by computing a histogram of the image and selecting the portion of the image corresponding to a portion of the histogram having a high number of adjacent pixel differences exceeding a threshold relative to other portions of the histogram; and
a controller coupled to the image processing unit and to the image selecting unit, the controller configured to control the operation of the display system based on image data.

18. The display system of claim 17, wherein the image selecting unit comprises:
an image partition unit configured to partition the image into horizontal portions;
a pixel difference unit coupled to the image partition unit, the pixel difference unit configured to compute a difference between a pixel and an adjacent pixel;
a histogram unit coupled to the pixel difference unit, the histogram unit configured to increment a count associated with the pixel if the pixel difference for the pixel exceeds a threshold; and
a portion select unit coupled to the histogram unit, the portion select unit configured to select horizontal portions of the image corresponding to counts having relatively high value.

19. The display system of claim 18, further comprising a filter unit coupled to the histogram unit, the filter unit configured to increment a count associated with the pixel if a percentage of pixels in a block of pixels exceeds a percentage threshold.

20. The display system of claim 18, wherein the portion select unit selects a portion of the image corresponding to multiple horizontal bins, and wherein the portion comprises contiguous horizontal bins.

* * * * *